(12) United States Patent
Contractor

(10) Patent No.: US 6,778,951 B1
(45) Date of Patent: Aug. 17, 2004

(54) INFORMATION RETRIEVAL METHOD WITH NATURAL LANGUAGE INTERFACE

(75) Inventor: Saeed Contractor, Miami, FL (US)

(73) Assignee: Concerto Software, Inc., Westford, MA (US)

(*) Notice: Subject to any disclaimer, the term of this patent is extended or adjusted under 35 U.S.C. 154(b) by 750 days.

(21) Appl. No.: 09/634,350

(22) Filed: Aug. 9, 2000

(51) Int. Cl.$^7$ .......................... G06F 17/20; G06F 17/28
(52) U.S. Cl. ..................................... 704/9; 707/3; 707/5
(58) Field of Search ................................. 704/231, 257, 704/270, 270.1, 9; 707/3, 4, 5, 6; 706/55

(56) References Cited

U.S. PATENT DOCUMENTS

| | | | |
|---|---|---|---|
| 3,333,271 A | 7/1967 | Robinson et al. | |
| 4,066,847 A | 1/1978 | Giordano | |
| 4,286,118 A | 8/1981 | Mehaffey et al. | |
| 4,356,348 A | 10/1982 | Smith | |
| 4,392,129 A | 7/1983 | Mehaffey et al. | |
| 4,408,100 A | 10/1983 | Pritz et al. | |
| 4,477,698 A | 10/1984 | Szlam et al. | |
| 4,494,229 A | 1/1985 | Jolissaint | |
| 4,510,351 A | 4/1985 | Costello et al. | |
| 4,540,855 A | 9/1985 | Szlam et al. | |
| 4,593,273 A | 6/1986 | Narcisse | |
| 4,599,493 A | 7/1986 | Cave | |
| 4,600,814 A | 7/1986 | Cunniff et al. | |
| 4,677,663 A | 6/1987 | Szlam | |
| 4,692,858 A | 9/1987 | Redford et al. | |
| 4,694,483 A | 9/1987 | Cheung | |
| 4,720,853 A | 1/1988 | Szlam | |
| 4,742,537 A | 5/1988 | Jesurum | |
| 4,742,538 A | 5/1988 | Szlam | |
| 4,742,539 A | 5/1988 | Szlam | |
| 4,757,267 A | 7/1988 | Riskin | |
| 4,782,463 A | 11/1988 | Sanders | |
| 4,782,510 A | 11/1988 | Szlam | |
| 4,792,968 A | 12/1988 | Katz | |
| 4,797,911 A | 1/1989 | Szlam et al. | |
| 4,811,240 A | 3/1989 | Ballou et al. | |
| 4,823,306 A | * 4/1989 | Barbic et al. ................... | 705/5 |
| 4,829,563 A | 5/1989 | Crockett et al. | |
| 4,858,120 A | 8/1989 | Samuelson | |
| 4,866,638 A | 9/1989 | Cosentino et al. | |
| 4,881,261 A | 11/1989 | Oliphant et al. | |
| 4,894,857 A | 1/1990 | Szlam et al. | |
| 4,896,345 A | 1/1990 | Thorne | |
| 4,933,964 A | 6/1990 | Girgis | |
| 4,939,771 A | 7/1990 | Brown et al. | |
| 4,939,773 A | 7/1990 | Katz | |

(List continued on next page.)

FOREIGN PATENT DOCUMENTS

EP 0855826 7/1998

OTHER PUBLICATIONS

M2 Presswire, 3COM: Cell IT launches breakthrough multimedia call center solution based on high speed 3Com systems; Mar. 4, 1998; 1–3 webpages; Coventry.

AT & T Technology; In The Forefront With Integrated Call Centers; Winter 1992; 1–7 webpages; New York.

Telemarketing & Call Center Solutions; How a Travel–Industry Call Center Excels; Sep. 1997; 1–2 webpages; Norwalk.

*Primary Examiner*—Richemond Dorvil
*Assistant Examiner*—Martin Lerner
(74) *Attorney, Agent, or Firm*—Bourque & Associates

(57) ABSTRACT

A method for retrieving documents in a knowledge database is disclosed in which a natural language query question is mapped to a plurality of equivalent strings. Both relevancies in meaning and in wording pattern are taken into account in ranking the equivalent strings by introducing respective weight factors. A document coupled to the top ranked equivalent string is retrieved and displayed to the questioner.

12 Claims, 3 Drawing Sheets

U.S. PATENT DOCUMENTS

| | | | |
|---|---|---|---|
| 4,988,209 | A | 1/1991 | Davidson et al. |
| 5,021,976 | A | 6/1991 | Wexelblat et al. |
| 5,041,992 | A | 8/1991 | Cunningham et al. |
| 5,062,103 | A | 10/1991 | Davidson et al. |
| 5,070,525 | A | 12/1991 | Szlam et al. |
| 5,115,501 | A | 5/1992 | Kerr |
| 5,119,072 | A | 6/1992 | Hemingway |
| 5,119,475 | A | 6/1992 | Smith et al. |
| 5,121,477 | A | 6/1992 | Koopmans et al. |
| 5,175,761 | A | 12/1992 | Ramsay et al. |
| 5,179,657 | A | 1/1993 | Dykstal et al. |
| 5,179,700 | A | 1/1993 | Aihara et al. |
| 5,181,236 | A | 1/1993 | LaVallee et al. |
| 5,206,903 | A | 4/1993 | Kohler et al. |
| 5,214,688 | A | 5/1993 | Szlam et al. |
| 5,276,731 | A | 1/1994 | Arbel et al. |
| 5,309,505 | A | 5/1994 | Szlam et al. |
| 5,309,513 | A | 5/1994 | Rose |
| 5,335,269 | A | 8/1994 | Steinlicht |
| 5,345,589 | A | 9/1994 | King et al. |
| 5,357,254 | A | 10/1994 | Kah |
| 5,386,412 | A | 1/1995 | Park et al. |
| 5,418,948 | A * | 5/1995 | Turtle ............................ 707/4 |
| 5,428,827 | A | 6/1995 | Kasser |
| 5,430,792 | A | 7/1995 | Jesurum et al. |
| 5,440,616 | A | 8/1995 | Harrington et al. |
| 5,490,211 | A | 2/1996 | Adams et al. |
| 5,500,891 | A | 3/1996 | Harrington et al. |
| 5,511,112 | A | 4/1996 | Szlam |
| 5,511,117 | A | 4/1996 | Zazzera |
| 5,519,773 | A | 5/1996 | Dumas et al. |
| 5,533,109 | A | 7/1996 | Baker |
| 5,535,270 | A | 7/1996 | Doremus et al. |
| 5,546,456 | A | 8/1996 | Vilsoet et al. |
| 5,553,133 | A | 9/1996 | Perkins |
| 5,568,544 | A | 10/1996 | Keeler et al. |
| 5,579,368 | A | 11/1996 | van Berkum |
| 5,581,602 | A | 12/1996 | Szlam et al. |
| 5,586,178 | A | 12/1996 | Koenig et al. |
| 5,588,045 | A | 12/1996 | Locke |
| 5,594,781 | A | 1/1997 | Kozdon et al. |
| 5,594,791 | A | 1/1997 | Szlam et al. |
| 5,619,557 | A | 4/1997 | Van Berkum |
| 5,623,540 | A | 4/1997 | Morrison et al. |
| 5,675,637 | A | 10/1997 | Szlam et al. |
| 5,689,240 | A | 11/1997 | Traxler |
| 5,696,818 | A | 12/1997 | Doremus et al. |
| 5,714,932 | A | 2/1998 | Castellon et al. |
| 5,715,307 | A | 2/1998 | Zazzera |
| 5,722,059 | A | 2/1998 | Campana |
| 5,722,064 | A | 2/1998 | Campana |
| 5,729,600 | A | 3/1998 | Blaha et al. |
| 5,742,233 | A | 4/1998 | Hoffman et al. |
| 5,815,565 | A | 9/1998 | Doremus et al. |
| 5,825,283 | A | 10/1998 | Camhl |
| 5,825,869 | A | 10/1998 | Brooks et al. |
| 5,828,731 | A | 10/1998 | Szlam et al. |
| 5,832,059 | A | 11/1998 | Aldred et al. |
| 5,832,070 | A | 11/1998 | Bloom et al. |
| 5,857,014 | A | 1/1999 | Sumner et al. |
| 5,864,615 | A | 1/1999 | Dezonno |
| 5,940,494 | A | 8/1999 | Rafacz et al. |
| 5,963,635 | A | 10/1999 | Szlam et al. |
| RE36,416 | E | 11/1999 | Szlam et al. |
| 5,991,394 | A | 11/1999 | Dezonno et al. |
| 6,028,601 | A * | 2/2000 | Machiraju et al. .......... 345/705 |
| 6,044,146 | A | 3/2000 | Gisby et al. |
| 6,044,355 | A | 3/2000 | Crockett et al. |
| 6,118,763 | A | 9/2000 | Trumbull |
| 6,134,530 | A | 10/2000 | Bunting et al. |
| 6,157,655 | A | 12/2000 | Shtivelman |
| 6,269,153 | B1 * | 7/2001 | Carpenter et al. ....... 379/88.02 |
| 6,272,347 | B1 | 8/2001 | Griffith et al. |
| 6,314,089 | B1 | 11/2001 | Szlam et al. |
| 6,359,892 | B1 | 3/2002 | Szlam |
| 6,359,982 | B1 | 3/2002 | Foster et al. |
| 6,362,838 | B1 | 3/2002 | Szlam et al. |
| 6,560,590 | B1 * | 5/2003 | Shwe et al. .................. 706/55 |
| 6,584,464 | B1 * | 6/2003 | Warthen ....................... 707/4 |
| 2002/0047859 | A1 | 4/2002 | Szlam et al. |
| 2002/0067822 | A1 | 6/2002 | Cohen et al. |
| 2002/0143878 | A1 | 10/2002 | Birnbaum et al. |
| 2002/0145624 | A1 | 10/2002 | Szlam et al. |
| 2002/0161896 | A1 | 10/2002 | Wen et al. |

\* cited by examiner

INFORMATION RETRIEVAL METHOD WITH NATURAL LANGUAGE INTERFACE

TECHNICAL FIELD

This invention relates to information retrieval technologies, and more particularly to a method for retrieving documents by intelligently matching a query string to one or more pre-stored strings. A novel ranking method is employed for said intelligent matching.

BACKGROUND OF THE INVENTION

Frequently Asked Questions ("FAQs") are commonly presented by customers to a company. Due to the high repetition of FAQs, standard answers are usually pre-stored in a database retrievable by a query inputted into the system. A customer may present the question by dialing into the IVR system of the company, or may input the query at the website of the company.

Natural language queries are more acceptable to common customers as no special searching rules are required to be understood. A questioner can simply input a question (a query string) in natural language into the retrieval system and receive the prestored, correct answer. This is implemented by a mapping technique used inside the retrieval system. Specifically, a group of sample questions are pre-stored in the database, each with a corresponding answer. Upon receiving a query in natural language format, the system intelligently maps, by using a relatively complex, artificial intelligence algorithm, the query question to a pre-stored sample question which is coupled to an answer.

Due to the casual use of words in a natural language query string, it is important to improve the technique in successfully mapping the query string to a sample string. At present, natural language processing techniques are able to detect equivalent strings (strings that have the essentially the same meaning as the query string). They may detect the equivalent strings that are worded very differently from the query string and reject strings that are worded similar to the query string but have a different meaning. Usually more than one equivalent string is mapped to the same query string and ranked by meaning. An answer coupled to the top ranked equivalent string (i.e., that which has a meaning closest to the input string) will be retrieved and displayed to the questioner.

However, there is no technique to further distinguish equivalent strings from each other if they have the same ranking in meaning. Furthermore, the ranking among equivalent strings relies solely on either correlation in meaning or correlation in wording pattern, neither of which may be accurate enough and both of which have their limitations.

Therefore, there exists a need for improved techniques for the retrieval system to map the query strings and the prestored strings more accurately.

SUMMARY OF THE INVENTION

In the novel method of the present invention, both meaning and wording pattern are taken into consideration in ranking equivalent strings. Separate modules are utilized, a first for matching the meaning of an input string to prestored questions, and a second and independently operating module for matching word patterns of an input string to a prestored string. When plural strings are deemed to have an equivalent meaning, the word pattern of each is examined and the word pattern closest to a prestored word pattern is utilized.

In a preferred embodiment, correlation in meaning and correlation in wording pattern are weighted with different factors to obtain a combined correlation for each equivalent string, and the ranking is implemented based on the combined correlation thus obtained.

BRIEF DESCRIPTION OF THE DRAWINGS

The above and further features and advantages of the present invention may be appreciated from the detailed description of preferred embodiments with reference to the accompanying drawings, in which:

FIG. 2 is an embodiment of the present invention; an.

DETAILED DESCRIPTION OF THE INVENTION

Figure 1:
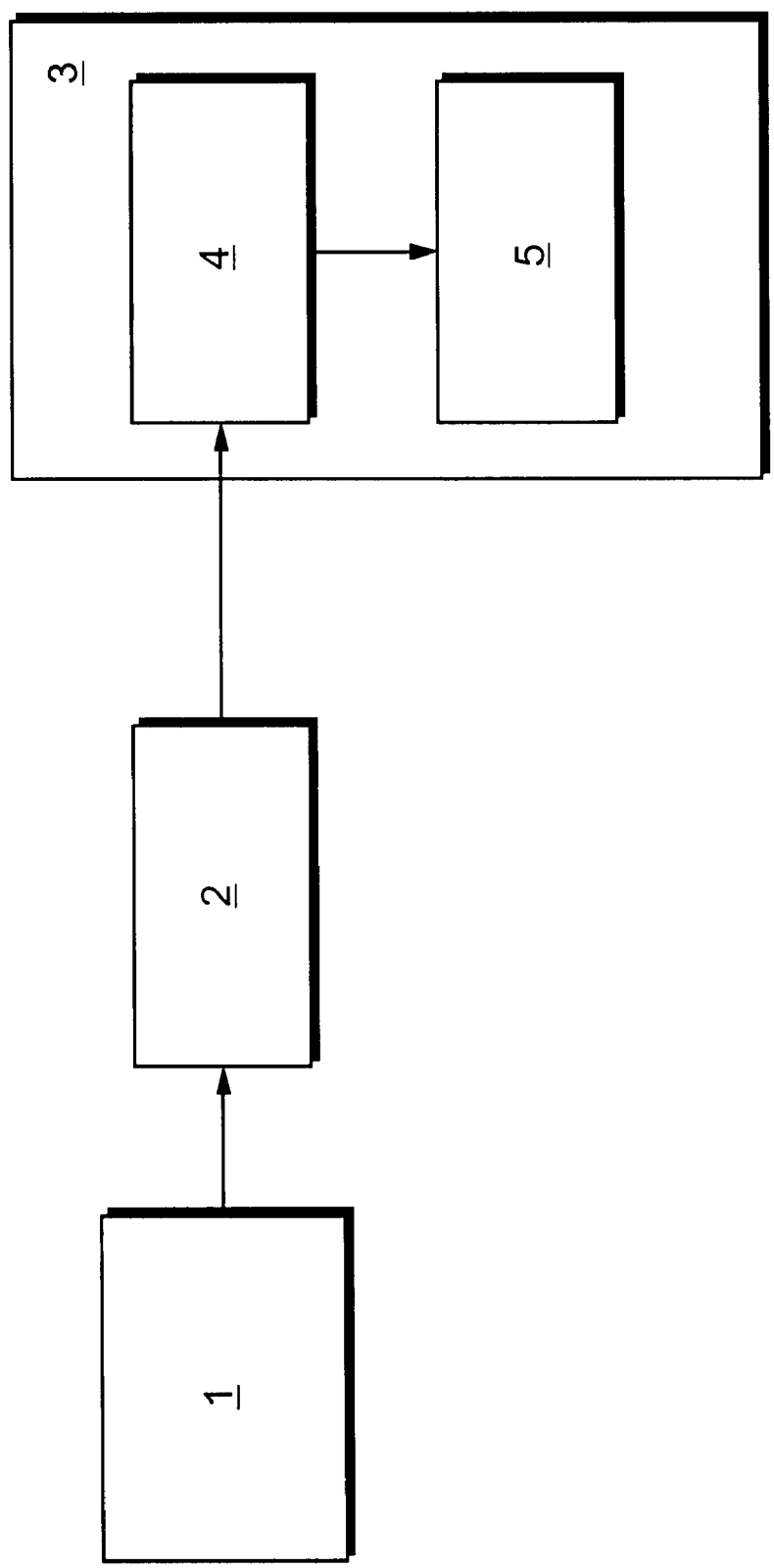
FIG. 1 is a schematic illustration of an FAQ retrieval system.

A typical FAQs retrieval system is schematically shown in FIG. 1. Database 3 comprises a question source 4 and an answer source 5. Sample questions are pre-stored in the question source 4 and each of the sample questions is coupled to one of the standard answers that is prestored in the answer source 5.

The natural language query questions are input at a natural language interface 1 which transmits the query to a natural language processor 2. The questions may be received via text over a data network, or via an audio signal over a data network or a telephone network. If the questions are received via an audio signal, then a speech recognition algorithm, many of which are commercially available, should be employed.

The natural language processor 2 runs to detect equivalent questions from the question source 4. These equivalent questions are ranked by their correlation in meaning to the query question input at the interface 1. Usually only the answer coupled to the top ranked equivalent question is retrieved and displayed to the user by a proper displaying means such as a monitor or printer. The system may also retrieve answers to some other equivalent questions other than the top ranked one, if necessary.

Natural language processors and recognition programs are available widely, and the details of how such programs are implemented are not critical to the present invention. In the present invention however, the output of such programs is not directly used, but instead is combined with a signal that measures the degree of correlation between the wording of an input string and that of potential matches.

Sometimes there may be more than one top ranked equivalent questions are detected. In such a situation, correlation in wording pattern may be taken into account to rank the equivalent questions, as shown in FIG. 2.

Figure 2:
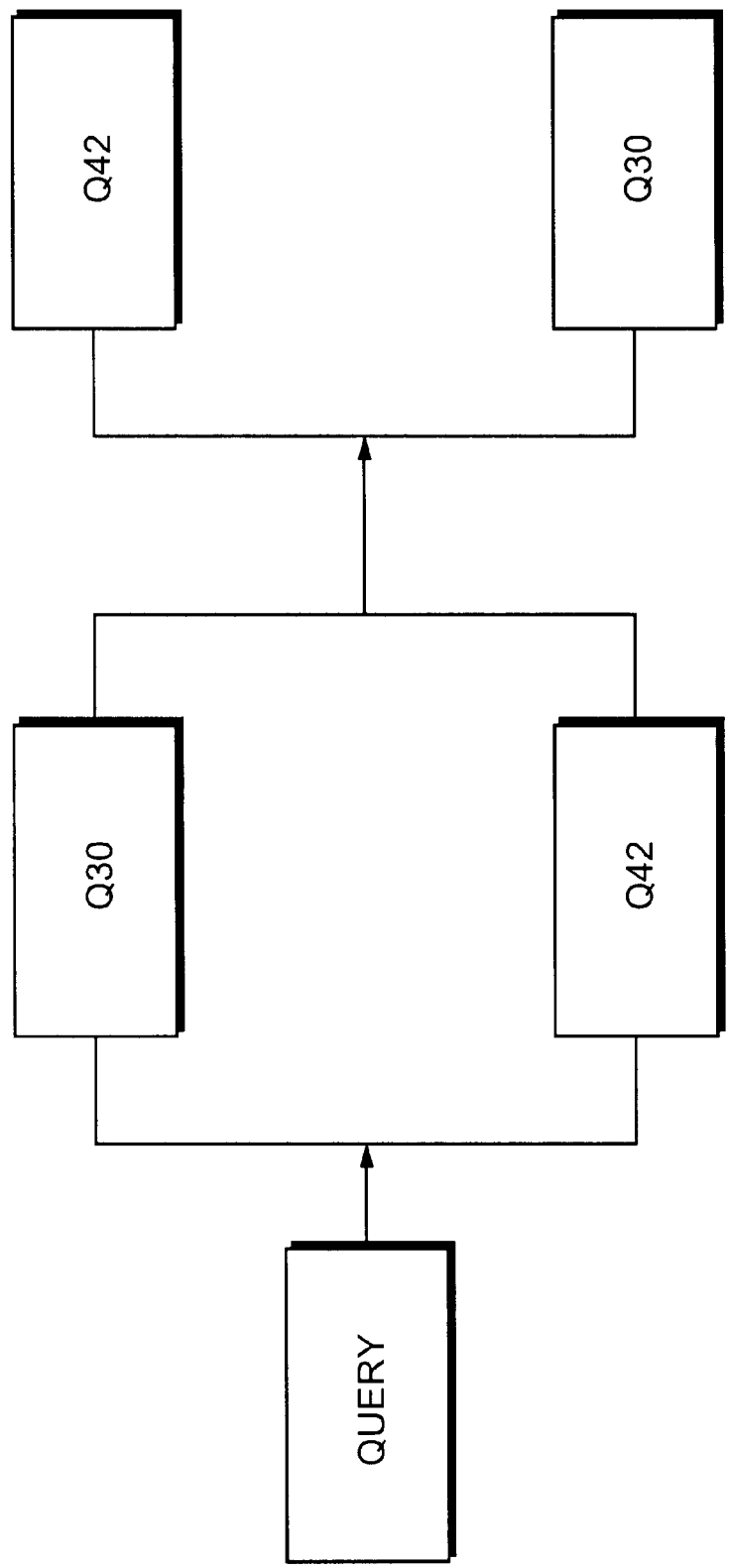

In FIG. 2, equivalent Questions 30 and 42 are found to have the same correlation in meaning to the query question. To further differentiate them, a step is introduced in which the wording pattern is also taken into consideration. For example, if the query question is "When can I get the payment?", the Question 30 is "How can I receive my money", and the Question 42 is "When can I receive the payment", finally the Question 42 is ranked over the Question 30 because of its higher correlation in wording pattern.

The wording pattern may comprise many factors. For example, the system may check how many words are used in both the query question and the equivalent question. Usually the words to be considered will not consider words such as the articles "a", "the" and the connectives such as "because", "therefore", etc. Moreover, the words will be considered in a stemmed form. For example, the words "paying", "payment", "pay" will all be considered as "pay".

Figure 3:
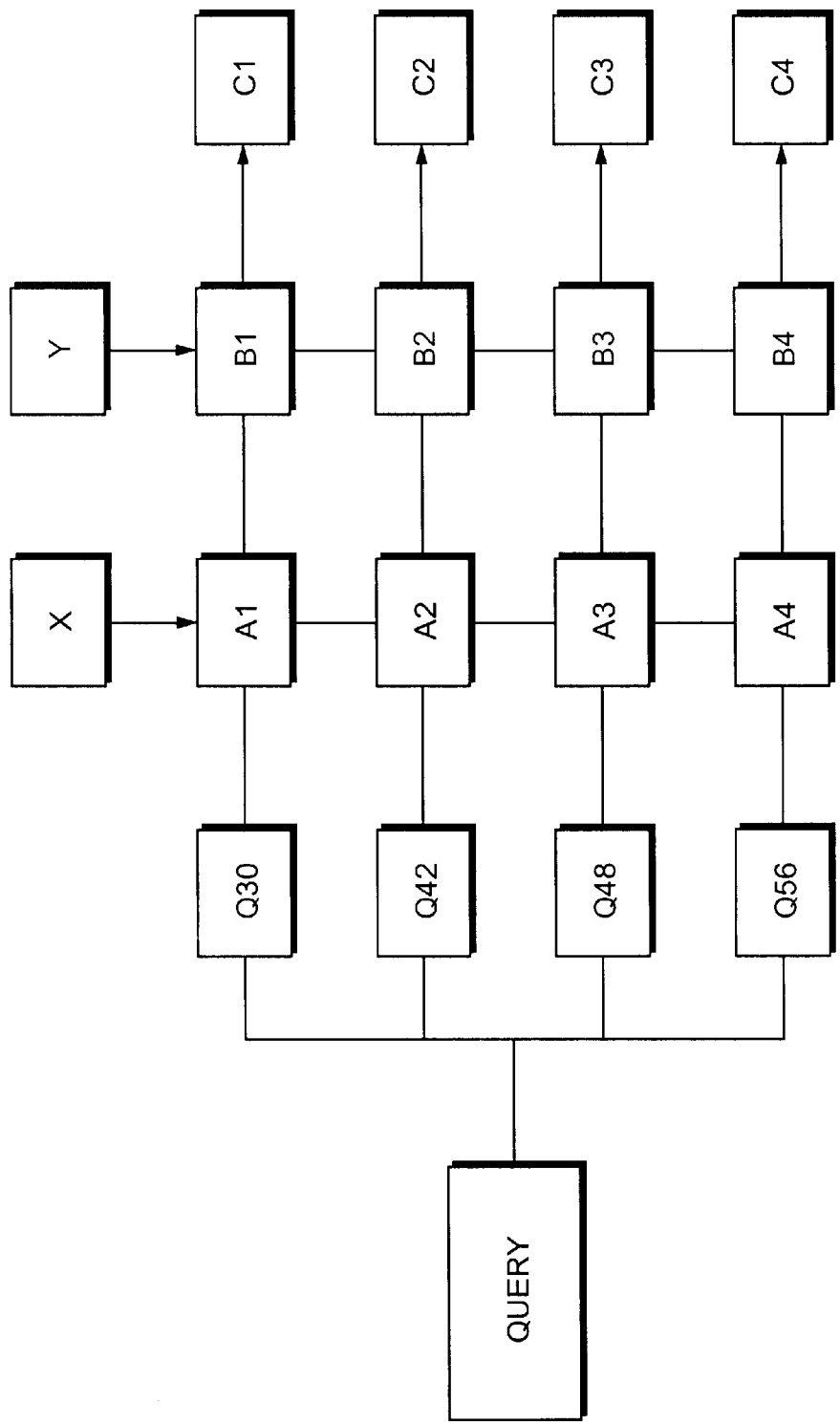
FIG. 3 is another embodiment of the present invention.

A more complicated embodiment is shown in FIG. 3. In this embodiment, both correlation in meaning and correlation in wording pattern are taken into account in determining ranks for all the equivalent questions.

Presumably, a query question results in four equivalent questions Q30, Q42, Q48 and Q56 that are highest ranked ones from the correlation in meaning. The system generates a first correlation value or score for meaning, and a second correlation value or score for wording pattern.

Conceptually, the A scores (i.e., A1–A4) measure the correlation in meaning while the B scores (i.e., B1–B4) measure the correlation in wording pattern. These two score series, however, may not have a same weight in ranking the equivalent questions. In some situations correlation in meaning may be more important than correlation in wording pattern, while in other situations correlation in wording pattern may be more important.

Having this in mind, a weighing system is introduced to compare the relevant importance of the two scores. In particular, a weight factor X is introduced for A scores and a weight factor Y is introduced for B scores. The relative importance of the relevancies in meaning and in wording pattern is quantified by weight factors X and Y. After being weighed, correlation algorithm is made on the two score series to get final combined scores "C1", "C2", "C3", and "C4" respectively, which reflect both relevancies in meaning and wording pattern as well as their relative importance. Finally the equivalent questions are ranked in accordance with these final combined C scores. Thus, the ranking results are more accurate. Factions that may be taken into account include number of words, length of the string, etc.

Usually an answer coupled to the top ranked sample question is retrieved and displayed to the questioner.

As an alternative, the system may first display one or more highest ranked equivalent questions to the questioner who may select one among them to retrieve the answer. This, however, may sometimes be inconvenient to the questioner by introducing an additional step and the questioner has to read through several questions before he can determine which is the best. This may be impractical if the query interaction is implemented over a telephone. Nonetheless, the user can be prompted to select one of several questions as they are read.

In a preferred embodiment, the weight factors X and Y may be changeable by a questioner so as to fine tune the weight factors X and Y. This is advantageous as a questioner is able to interact with the system. If the questioner is not satisfied with a query result, he may change the weight factors X and/or Y to try for a better hit without changing his query question.

For example, if a query question uses more distinguishable keywords, the questioner may increase the weight factor Y so that the final ranking scores will rely more on the correlation in wording pattern than correlation in meaning. If the words used in a query question is less distinguishable, a higher weight factor X may produce a better result.

In the past, the correlation between a query question and the equivalent questions cannot be changed unless the questioner changes the query question. Therefore, in order to get a better hit, the questioner had to try many query questions until he got the right answer. With the present invention, it is much more convenient if the questioner may adjust the ranking by only changing the weight factors.

Though the above takes a FAQs answer retrieval system as an exemplary embodiment, it will be appreciated that the present invention is also applicable in other document or information retrieval systems and that modifications and variations will be possible to those with ordinary skill in the art without departing from the spirit of the invention. The scope of the invention is therefore intended to be solely defined in the claims.

What is claimed:

1. A method of retrieving documents in a database retrieval system having a knowledge database, the method comprising the acts of a. receiving a query string inputted by a user into a natural language interface of said database retrieval system, said interface being coupled to a string source having a plurality of pre-stored strings, each of said pre-stored strings being coupled to one of said documents;

b. in response to said receiving act, detecting from said strings source a plurality of equivalent strings having essentially the same meaning as said query string;

c. in response to said detecting act, initially ranking said plurality of equivalent strings by a weighing correlation between said query string and each of said equivalent strings;

d. generating a first correlation value for the meaning of each of said plurality of equivalent strings;

e. in response to said act of generating a first correlation value, quantifying the correlation in meaning between said equivalent strings and said query string with a first factor;

f. generating a second correlation value for a wording pattern of each of said plurality of equivalent strings;

g. in response to said act of generating a second correlation value, quantifying the correlation in wording pattern between said equivalent strings and said query string with a second factor;

h. in response to said quantifying acts, ranking said equivalent strings by a combined correlation of meanings and wording patterns for each of said plurality of equivalent strings; and i. in response to said act of ranking said equivalent strings, retrieving a document coupled to a selected and ranked equivalent string and displaying said document to said user.

2. The method of claim 1 wherein said first and second factors are adjustable by said user.

3. The method of claim 1 wherein said pre-stored strings are sample questions and said documents are answers to each of said sample questions.

4. The method of claim 1 wherein said first factor is larger than said second factor.

5. The method of claim 1 wherein said second factor is larger than said first factor.

6. The method of claim 1 wherein said selected equivalent string is a top ranked equivalent string.

7. The method of claim 1 further comprising a step of displaying one or more highest ranked equivalent strings, and said selected equivalent string is determined by said user by selecting among said displayed equivalent strings.

8. An information retrieval system, comprising:

a knowledge database having a document source comprising a plurality of documents and a string source comprising a plurality of pre-stored strings, each of said pre-stored strings being coupled to at least one of said documents;

a natural language interface for a user to input a query string, said interface being coupled to said string source;

a natural language processor for detecting equivalent strings having essentially the same meaning as said query string input at said natural language interface;

means for weighing a correlation in meaning between said query string and said equivalent strings by a first factor, and weighing a correlation in wording pattern between said query and said equivalent strings by a second factor, so as to obtain a combined correlation;

means for ranking said equivalent strings with said combined correlation; and means for retrieving said documents coupled to a selected equivalent string.

9. The retrieval system of claim 8 further comprises means for said user to adjust said first and second factors.

10. The retrieval system of claim 8 wherein said selected equivalent string is a top ranked string.

11. The retrieval system of claim 8 further comprising means for displaying to said user one or more highest ranked equivalent strings, and means for said user to select one of them as said selected equivalent string so as to retrieve said document.

12. The retrieval system of claim 8 wherein said wording pattern comprises number of same words used in both said query string and said equivalent strings.

* * * * *